US008575961B2

(12) United States Patent
Kojima

(10) Patent No.: US 8,575,961 B2
(45) Date of Patent: Nov. 5, 2013

(54) MULTI-VALUED DRIVER CIRCUIT

(75) Inventor: Shoji Kojima, Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 13/501,451

(22) PCT Filed: Oct. 13, 2009

(86) PCT No.: PCT/JP2009/005330
§ 371 (c)(1),
(2), (4) Date: Apr. 11, 2012

(87) PCT Pub. No.: WO2011/045830
PCT Pub. Date: Apr. 21, 2011

(65) Prior Publication Data
US 2012/0201284 A1   Aug. 9, 2012

(51) Int. Cl.
*H03K 19/00* (2006.01)
*H04L 27/04* (2006.01)
(52) U.S. Cl.
USPC .............................. 326/59; 341/154; 375/224
(58) Field of Classification Search
USPC ........................................................... 326/59
See application file for complete search history.

(56) References Cited

U.S. PATENT DOCUMENTS

| 4,833,473 | A | * | 5/1989 | Dingwall | 341/154 |
| 5,008,676 | A | * | 4/1991 | Kanoh | 341/154 |
| 5,633,599 | A | * | 5/1997 | Kubota | 326/16 |
| 7,053,655 | B2 | * | 5/2006 | Brox | 326/60 |
| 7,639,165 | B2 | * | 12/2009 | Sutardja | 341/120 |
| 7,809,052 | B2 | * | 10/2010 | Li | 375/226 |
| 8,274,296 | B2 | * | 9/2012 | Kawabata et al. | 324/537 |

FOREIGN PATENT DOCUMENTS

| JP | 54-11613 | 1/1979 |
| JP | 1-158823 | 6/1989 |
| JP | 3-238927 | 10/1991 |
| JP | 9-172361 | 6/1997 |

OTHER PUBLICATIONS

Analog Devices, Basic DAC Architectures II: Binary DACs, by Walt Kester Oct. 2008.*
ISR for related PCT/JP2009/005330 mailed on Dec. 28, 2009.
IPRP/WO for related PCT/JP2009/005330 issued on May 15, 2012.

* cited by examiner

*Primary Examiner* — Shawki Ismail
*Assistant Examiner* — Nelson Correa
(74) *Attorney, Agent, or Firm* — Ladas & Parry, LLP

(57) ABSTRACT

A multi-valued driver circuit selectively outputs, to a transmission line, one from among multiple voltages according to a selection signal. A memory circuit stores setting data which define the respective levels of the multiple voltages. According to the selection signal, a selector circuit selects one from among the multiple setting data stored in the memory circuit. A Thevenin termination circuit outputs a voltage that corresponds to the upper M bits of the data thus selected by the selector circuit. An R-2R ladder circuit outputs a voltage that corresponds to the lower Nl bits of the data thus selected by the selector circuit.

12 Claims, 8 Drawing Sheets

SEL1, SEL2

BUF a multi-valued test pattern signal or otherwise a multi-valued control signal to a DUT (device under test).

Such a multi-valued driver employed in such a test apparatus is preferably configured to be capable of adjusting the respective voltage levels employed in a multi-valued level signal as desired according to the kind of DUT to be tested, the kind of test, and so forth. Furthermore, in applications other than such a test apparatus, there is a demand for a multi-valued driver circuit which is capable of adjusting the voltage levels as desired.

MULTI-VALUED DRIVER CIRCUIT

CROSS-REFERENCE TO RELATED APPLICATIONS

This application is the U.S. National Stage of International Patent Application No. PCT/JP2009/005330 filed on Oct. 13, 2009, the disclosure of which is hereby incorporated by reference in its entirety.

BACKGROUND OF THE INVENTION

1. Field of the Invention

The present invention relates to a driver circuit configured to output a signal via a transmission line.

2. Description of the Related Art

In order to transmit a multi-valued level signal to a semiconductor device connected via a transmission line, a multi-valued driver is employed. Typical examples of such a multi-valued driver, which is configured to output a voltage Vdd that corresponds to high level and a voltage Vss that corresponds to low level, include a buffer (inverter) including a P-channel MOSFET (Metal Oxide Semiconductor Field Effect Transistor) and an N-channel MOSFET connected in a push-pull manner.

FIG. 1A is an equivalent circuit diagram which shows a schematic configuration of a multi-valued driver circuit, and FIG. 1B is an operation waveform diagram showing the operation of the multi-valued driver circuit. An output port Po of a multi-valued driver circuit 200 is connected to an unshown device via a transmission line 202. The multi-valued driver circuit 200 is configured to selectively output one from among a high-level voltage VIH, a low-level voltage VIL, and a terminal voltage VTT, according to a selection signal s0 through s2.

The multi-valued driver circuit 200 includes a selector 204, a buffer 206, and an output resistor Ro. The selector 204 is configured to receive, as input signals, three voltages, i.e., VIH, VIL, and VTT, via three input terminals (0, 1, 2), respectively. The selector 204 is configured to select one from among the three voltages VIH, VIL, and VTT, according to a 3-bit selection signal s0 through s2. For example, such three voltages VIH, VIL, and VTT, having three respective values, are generated by an unshown D/A converter or the like. When the selection signal component s0 is asserted (set to high level), the selector 204 outputs the terminal voltage VTT. When the selection signal component s1 is asserted, the selector 204 outputs the high-level voltage VIH. When the selection signal component s2 is asserted, the selector 204 outputs the low-level voltage VIL. The buffer 206 is configured to receive the voltage thus selected by the selector 204, and to output the voltage thus received to the transmission line 202 via the output resistor Ro.

RELATED ART DOCUMENTS

[Patent Documents]
[Patent Document 1]
Japanese Patent Application Laid Open No. H09-172361
[Patent Document 2]
U.S. Pat. No. 4,833,473 Specification
[Patent Document 3]
U.S. Pat. No. 5,008,676 Specification A semiconductor test apparatus (which will also be referred to simply as the "test apparatus") configured to test memory, DSP (Digital signal Processor), etc., includes a multi-valued driver circuit configured to supply a multi-val-

SUMMARY OF THE INVENTION

The present invention has been made in view of such a situation. Accordingly, it is an exemplary purpose of an embodiment of the present invention to provide a multi-valued driver circuit with adjustable voltage levels.

An embodiment of the present invention relates to a multi-valued driver circuit configured to selectively output, to a transmission line, one from among K (K represents an integer of 2 or more) voltages according to a selection signal. The multi-valued driver circuit is configured to be capable of independently adjusting the K voltages according to (M+Nl)-bit (M and Nl each represent an integer) setting data. The multi-valued driver circuit comprises: an output port connected to the transmission line; first memory configured to store the upper M bits of the setting data for each of the K voltages; second memory configured to store the lower Nl bits of the setting data for each of the K voltages; M first selectors respectively provided for the upper M bits of the setting data, and configured to receive the corresponding bits of the K setting data, and to select one from among the corresponding bits of the K setting data according to the selection signal; Nl second selectors respectively provided for the lower Nl bits of the setting data, and configured to receive the corresponding bits of the K setting data, and to select one from among the corresponding bits of the K setting data according to the selection signal; M first buffer units respectively provided for the M first selectors, and each configured to output a voltage that corresponds to the output value of the corresponding first selector; M first resistors respectively provided for the M first buffer units, each configured to have a resistance value R, and each arranged such that the output voltage of the corresponding first buffer unit is applied to one terminal thereof, and the other terminal thereof is connected to the output port; Nl second buffer units respectively provided for the Nl second selectors, and each configured to output a voltage that corresponds to the output value of the corresponding second selector; a third buffer unit configured to generate a fixed voltage; Nl second resistors respectively provided for the Nl second buffer units, each configured to have a resistance value R, and each arranged such that the output voltage of the corresponding second buffer unit is applied to one terminal thereof; a third resistor configured to have a resistance value R, and arranged such that the output voltage of the third buffer unit is applied to one terminal thereof; and Nl fourth resistors connected so as to form an R-2R ladder network together with the Nl second resistors and the third resistor, with the aforementioned output port as an output terminal of the R-2R ladder network.

Another embodiment of the present invention also relates to a multi-valued driver circuit configured to selectively output one from among K (K represents an integer of 2 or more) voltages according to a selection signal. The multi-valued driver circuit is configured to be capable of independently adjusting the K voltages according to (Nu+Nl)-bit (Nu and Nl each represent an integer) setting data. The multi-valued driver circuit comprises: an output port connected to a transmission line; first memory configured to store the upper Nu bits of the setting data for each of the K voltages; second memory configured to store the lower Nl bits of the setting data for each of the K voltages; Nu first selectors respectively provided for the upper Nu bits of the setting data, and configured to receive the corresponding bits of the K setting data, and to select one from among the corresponding bits of the K setting data according to the selection signal; Nl second selectors respectively provided for the lower Nl bits of the setting data, and configured to receive the corresponding bits of the K setting data, and to select one from among the corresponding bits of the K setting data according to the selection signal; L ($L=2^{Nu}-1$) first buffer units grouped into a plurality of groups, the j-th (j=0, 1, . . . , Nu−1) group including $2^j$ first buffer units, and arranged such that the input terminals of the first buffer units that belong to the same group are connected together for each group, and such that the $2^j$ first buffer units that belong to the j-th group each output a voltage that corresponds to the output value of the first selector that corresponds to the lower (j+Nl)-th bit of the setting data; L first resistors respectively provided for the L first buffer units, each configured to have a resistance value R, and each arranged such that the output voltage of the corresponding first buffer unit is applied to one terminal thereof and the other terminal thereof is connected to the output port; Nl second buffer units respectively provided for the Nl second selectors, and each configured to output a voltage that corresponds to the output value of the corresponding second selector; Nl second resistors respectively provided for the Nl second buffer units, each configured to have a resistance value R, and each arranged such that the output voltage of the corresponding second buffer unit is applied to one terminal thereof; a third buffer unit configured to generate a fixed voltage; a third resistor configured to have a resistance value R, and arranged such that the output voltage of the third buffer unit is applied to one terminal thereof; and Nl fourth resistors each configured to have a resistance value of R/2, and connected so as to form an R-2R ladder network together with the Nl second resistors and the third resistor, with the aforementioned output port as an output terminal of the R-2R ladder network.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1A:
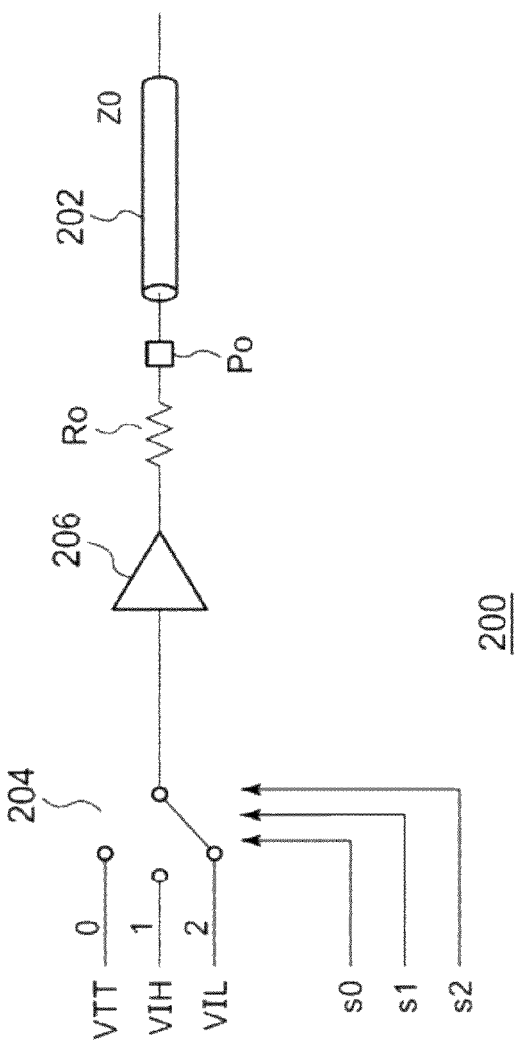
FIG. 1A is an equivalent circuit diagram showing a schematic configuration of a multi-valued driver circuit.
Figure 1B:
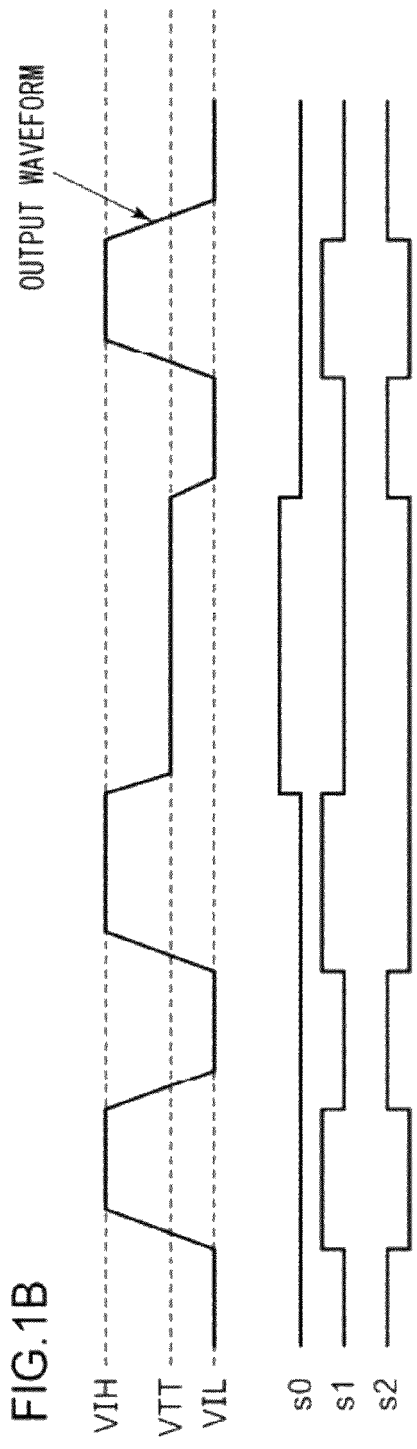
FIG. 1B is an operation waveform diagram thereof.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, a state represented by the phrase "the member A is connected to the member B" includes a state in which the member A is indirectly connected to the member B via another member that does not affect the electric connection therebetween, in addition to a state in which the member A is physically and directly connected to the member B. Similarly, a state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

[First Embodiment]

Figure 2:
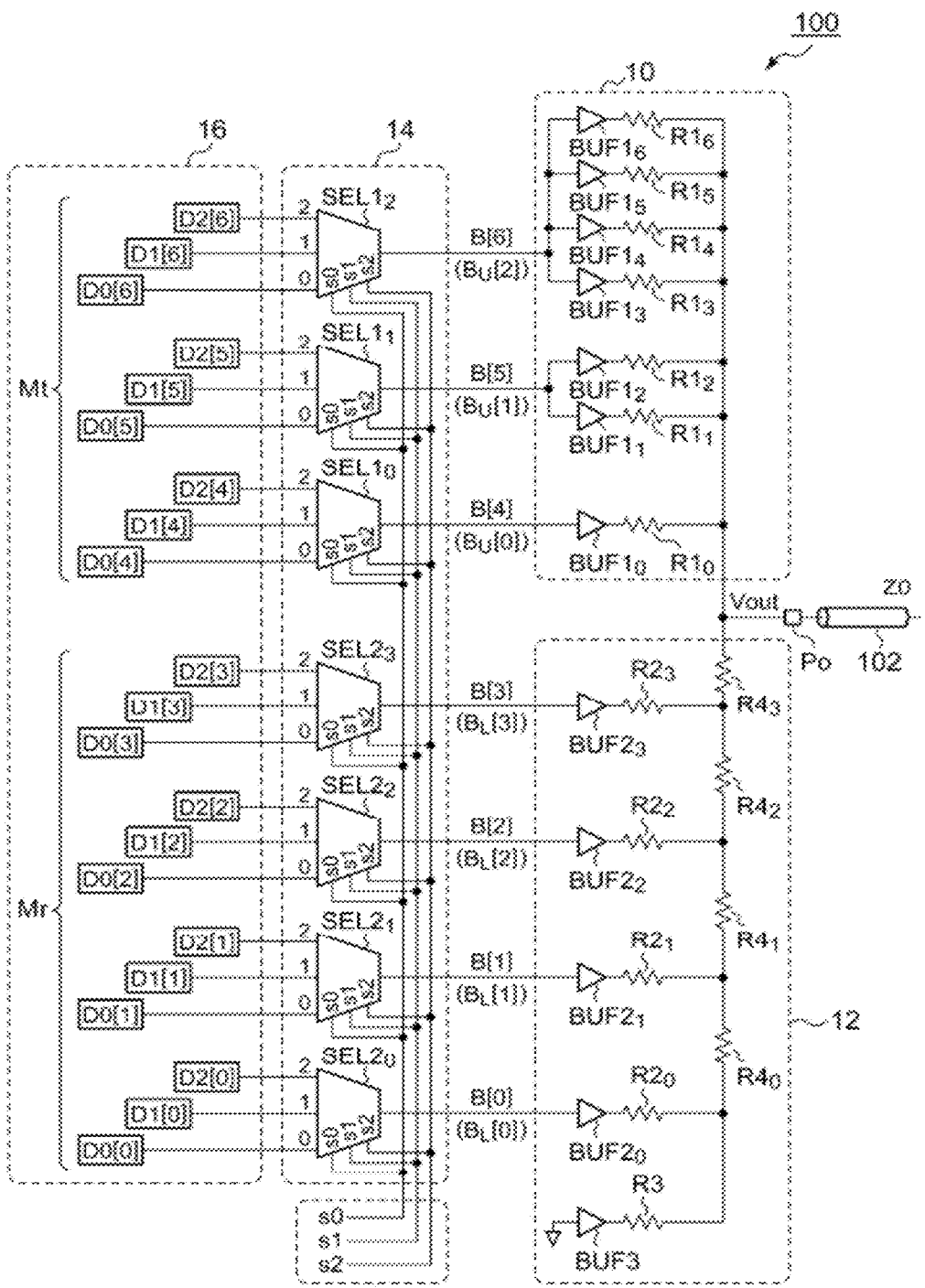
FIG. 2 is a circuit diagram which shows a configuration of a multi-valued driver circuit according to a first embodiment.

FIG. 2 is a circuit diagram which shows a configuration of a multi-valued driver circuit 100 according to a first embodiment. The multi-valued driver circuit 100 is configured to selectively output, to a transmission line 102, one from among K (K represents an integer of 2 or more) voltages according to a selection signal s0 through s(K−1). Description will be made below regarding an arrangement in which K=3. However, the present invention is not restricted to such an arrangement. Rather, the present invention can be applied to an arrangement employing a desired number of voltages. In a case in which the multi-valued driver circuit 100 is employed in a test apparatus as described later, there are often cases in which there is a need to configure an arrangement in which K=3, which requires three kinds of voltages, i.e., a terminal voltage VTT, a high-level voltage VIH, and a low-level voltage VIL. Alternatively, in the future, test apparatuses will require a greater number of voltage levels.

Such an arrangement is capable of adjusting the K voltages independently according to (Nu+Nl)-bit (Nu and Nl each represent an integer) setting data. Description will be made in the embodiment regarding an arrangement in which Nu=3 and Nl=4. The j-th (0≤j≤K−1) voltage level is defined by 7-bit setting data Dj[6:0].

When the selection signal s0 is asserted (set to high level), the multi-valued driver circuit 100 outputs a first voltage V0 that corresponds to the first setting data D0. When the selection signal s1 is asserted, the multi-valued driver circuit 100 outputs a second voltage V1 that corresponds to the second setting data D1. When the selection signal s2 is asserted, the multi-valued driver circuit 100 outputs a third voltage V2 that corresponds to the third setting data D2.

It should be noted that the data format of the selection signal s0 through s2 is not restricted to such an arrangement according to the embodiment. It can be clearly understood by those skilled in this art that at least a 2-bit selection signal is required in a case in which a three-valued voltage is to be switched.

The multi-valued driver circuit 100 includes an output port Po, a Thevenin termination circuit 10, an R-2R ladder circuit 12, a selector circuit 14, and a memory circuit 16.

The memory circuit 16 includes first memory Mt and second memory Mr. The first memory Mt is configured to hold the upper Nu (=3) bits of each of the setting data D0 through D2, i.e., D0[6:4], D1[6:4], and D2[6:4], used to define the K respective voltages. The second memory Mr is configured to hold the lower Nl (=4) bits of each of the setting data D0 through D2, i.e., D0[3:0], D1[3:0], and D2[3:0], used to define the K respective voltages. Such a memory circuit may be preferably configured as a register, RAM (Random Access Memory), ROM (Read Only Memory), or the like.

The selector circuit 14 includes Nu first selectors $SEL1_0$ through $SEL1_2$ and Nl second selectors $SEL2_0$ through $SEL2_3$. The Nu first selectors $SEL1_0$ through $SEL1_2$ are arranged for the respective upper Nu bits D[Nu+Nl−1:Nl] of the setting data D0 through D2, i.e., for the respective bits of D[6:4]. The Nu first selectors $SEL1_0$ through $SEL1_2$ each include K (=3) input terminals 0 through 2. The i-th (0≤i≤Nu−1) first selector $SEL1_i$ is configured to receive the lower (i+Nl)-th bits of the respective setting data D0 through D2, and to select one from among the bit data thus received according to the selection signal s0 through s2. Specifically, in a case in which the j-th selection signal sj is asserted, the i-th first selector $SEL1_i$ selects the (i+Nl)-th bit data of the j-th setting data Dj.

The Nl second selectors $SEL2_0$ through $SEL2_3$ are arranged for the respective lower Nl bits of the setting data D0 through D2, i.e., for the respective bits of D[Nl−1:0]. The Nl second selectors $SEL2_0$ through $SEL2_3$ each include K (=3) input terminals 0 through 2. The i-th (0≤i≤Nl−1) second selector $SEL2_i$ is configured to receive the lower i-th bits of the respective setting data D0 through D2, and to select one from among the bit data thus received according to the selection signal s0 through s2. Specifically, when the j-th selection signal sj is asserted, the i-th second selector $SEL2_i$ selects the lower i-th bit data of the j-th setting data Dj.

The Thevenin termination circuit 10 includes L (L= $\Sigma_{j=0:Nu-1} 2^j = 2^{Nu}-1$) first buffer units $BUF1_0$ through $BUF1_6$, and L first resistors $R1_0$ through $R1_6$. In a case in which Nu=3, L is represented by L=1+2+4=7. As described below, the Thevenin termination circuit 10 shown in FIG. 2 is weighted in a binary manner.

The L first buffer units $BUF1_0$ through $BUF1_6$ are grouped into groups, the j-th (j=0, 1, . . . , Nu−1) group including $2^j$ first buffer units. Specifically, the L first buffer units $BUF1_0$ through $BUF1_6$ are grouped into a group of a single buffer unit, a group of two buffer units, a group of four buffer units, and so forth. The input terminals of the first buffer units that belong to the same group are connected together for each group. The $2^j$ first buffer units BUF1 that belong to the j-th group are each configured to output a voltage that corresponds to an output value B[j+Nl] of the first selector $SEL1_i$ that corresponds to the lower (j+Nl)-th bit of the setting data.

Each first buffer unit BUF1 and each second buffer unit BUF2 described later are each configured to receive the corresponding data B, which is set to high level (1) or low level (0), and to output a voltage (e.g., either one of Vdd or Vss) according to the value of the data B thus received. Each first buffer unit BUF1 and each second buffer unit BUF2 may each be configured as a CMOS inverter or otherwise as a CMOS buffer unit including an even number of CMOS inverters connected in series. Description will be made below regarding an arrangement in which, when a high-level signal is input, each first buffer BUF1 and each second buffer BUF2 are each configured to output Vdd, and when a low-level signal is input, they are each configured to output Vss.

The L first resistors $R1_0$ through $R1_6$ are arranged for the respective L first buffer units $BUF1_0$ through $BUF1_6$. The first resistors $R1_0$ through $R1_6$ are each configured to have the same resistance R. The first resistors $R1_0$ through $R1_6$ are each arranged such that the output voltage of the corresponding first buffer unit BUF1 is applied to one terminal thereof, and the other terminal thereof is connected to the output port Po.

The R-2R ladder circuit 12 includes Nl second buffer units $BUF2_0$ through $BUF2_3$, a third buffer unit BUF3, Nl second resistors $R2_0$ through $R2_3$, and Nl fourth resistors $R4_0$ through $R4_3$.

The Nl second buffer units $BUF2_0$ through $BUF2_3$ are respectively arranged for the Nl second selectors $SEL2_0$ through $SEL2_3$, and are respectively configured to output voltages that correspond to the respective output values B[0] through B[3] of the respective second selectors $SEL2_0$ through $SEL2_3$.

The Nl second resistors $R2_0$ through $R2_3$ are arranged for the respective Nl second buffer units $BUF2_0$ through $BUF2_3$. The second resistors $R2_0$ through $R2_3$ are each configured to have the same resistance R. The second resistors $R2_0$ through $R2_3$ are each arranged such that the output voltage of the corresponding one of the second buffer units $BUF2_0$ through $BUF2_3$ is applied to one terminal thereof.

The third buffer unit BUF3 is configured to generate a fixed voltage. The fixed voltage may be configured as either one of Vdd or Vss. The third resistor R3 is configured to have the resistance R, and is arranged such that the output voltage of the third buffer unit BUF3 is applied to one terminal thereof.

The Nl fourth resistors $R4_0$ through $R4_3$ are connected together with Nl second resistors $R2_0$ through $R2_3$ and the third resistor R3 so as to form an R-2R ladder network with the output port Po as an output terminal of the R-2R ladder network. The Nl fourth resistors $R4_0$ through $R4_3$ are each configured to have the resistance R/2.

Figure 3:
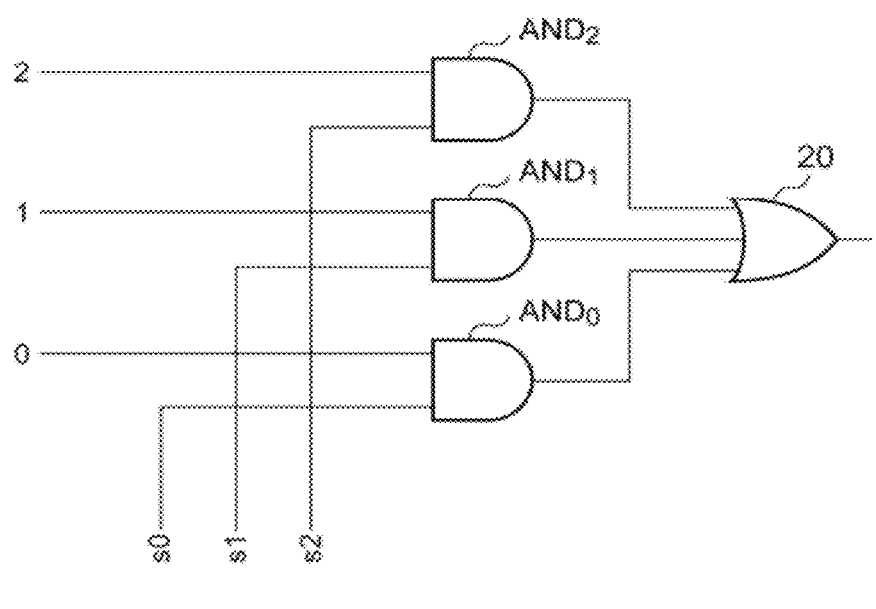
FIG. 3 is a circuit diagram which shows an example configuration of each of a first selector and a second selector shown in FIG. 2.

FIG. 3 is a circuit diagram which shows an example configuration of each of the first selector and the second selector. The first selector SEL1 and the second selector SEL2 (which will be collectively referred to simply as the "selector SEL") each include K AND gates $AND_0$ through $AND_{K-1}$ arranged for K respective input terminals 0 through K−1, and an OR gate 20. The j-th (0≤j≤K−1) AND gate AND is configured to generate the logical AND of a j-th input signal and a j-th selection signal sj. The OR gate 20 is configured to generate the logical OR of the output signals of the K AND gates $AND_0$ through $AND_{K-1}$.

The above is the configuration of the multi-valued driver circuit 100. Next, description will be made regarding the operation thereof.

The selector circuit 14 is configured to output one from among the setting data D0[6:0], D1[6:0], and D2[6:0] stored in the memory circuit 16 according to the selection signal s0 through s2. The value of the (Nu+Nl)-bit binary data B[6:0] output from the selector 14 is represented by the following Expression (1).

$$B = \sum_{i=0:Nu+Nl-1} (2^i \cdot B[i]) \quad (1)$$

With regard to the binary data B[6:0], the upper Nu-bit (3-bit) B[6:4] assigned to the Thevenin termination circuit 10 will be represented by $B_U$[Nu–1:0]. The value of the binary data $B_U$[Nu–1:0] is represented by the following Expression (2).

$$B_U = \sum_{i=0:Nu-1} (2^i \bullet B_u[i]) \quad (2)$$

Similarly, with regard to the binary data B[6:0], the lower Nl-bit (4-bit) B[3:0] assigned to the R-2R ladder circuit will be represented by $B_L$[Nl–1:0]. The value of the binary data $B_L$[Nl–1:0] is represented by the following Expression (3).

$$B_L = \sum_{i=0:Nl-1} (2^i \bullet B_L[i]) \quad (3)$$

The following Expression (4) is obtained based upon the aforementioned Expressions (1) through (3).

$$B = B_L + B_U 2^{Nl} \quad (4)$$

Directing attention to the Thevenin termination circuit 10, the output voltage $V_U$ and the output impedance $Z_U$ of the Thevenin termination circuit 10, which receives the upper data $B_U$[Nu–1:0], are represented by the following Expressions (5) and (6), respectively.

[Math. 1]

$$V_U = (Vdd - Vss)\frac{B_U}{2^{Nu} - 1} + Vss \quad (5)$$

$$Z_U = \frac{R}{2^{Nu} - 1} \quad (6)$$

Directing attention to the R-2R ladder circuit 12, the output voltage $V_L$ and the output impedance $Z_L$ of the R-2R ladder circuit 12, which receives the lower data $B_L$[Nl–1:0], are represented by the following Expressions (7) and (8), respectively.

[Math. 2]

$$V_L = (Vdd - Vss)\frac{B_L}{2^{Nl}} + Vss \quad (7)$$

$$Z_L = R \quad (8)$$

In a case in which the Thevenin termination circuit 10 and the R-2R ladder circuit 12 are connected in parallel with each other as shown in FIG. 2, the output voltage $V_{OUT}$ and the output impedance $Z_{OUT}$ are represented by the following Expressions (9) and (10).

[Math. 3]

$$V_{out} = \frac{Z_U \cdot V_L + Z_L \cdot V_U}{Z_U + Z_L} = (Vdd - Vss)\frac{B}{2^{Nu+Nl}} + Vss \quad (9)$$

$$Z_{out} = Z_L // Z_U = \frac{R}{2^{Nu}} \quad (10)$$

As can be clearly understood from Expression (9), the multi-valued driver circuit 100 shown in FIG. 2 is capable of outputting the voltage $V_{OUT}$ that is proportional to the value B defined by the binary data B[6:0] output from the selector circuit 14.

It should be noted that each bit B[i] of the binary data B[6:0] can be calculated using the following Expression (11). Here, "int(x)" represents a function for providing a maximum integer that does not exceed x, and "mod(m,n)" represents the remainder after the integer m is divided by n, i.e., the modulo calculation.

[Math. 4]

$$B[i] = int\left(\frac{mod(B, 2^{i+1})}{2^i}\right) \quad (11)$$

With such a multi-valued driver circuit 100, by writing the respective setting data D0[6:0] through D2[6:0] to the memory circuit 16 according to the voltage values required for the first voltage V0 through the third voltage V2, such an arrangement allows the voltage values of the respective voltages V0 through V2 to be set as desired.

Subsequently, after the respective setting data D0 through D2 are written to the memory circuit 16, by supplying the selection signal s0 through s2, such an arrangement allows the multi-valued driver circuit 100 to generate one from among the multiple voltages V0 through V2 according to the selection signal s0 through s2.

Furthermore, with such a multi-valued driver circuit 100, by increasing the number of setting data to be stored in the memory circuit 16, and by increasing the number of input terminals of each of the first selectors and the second selectors, such an arrangement allows the number of voltages that can be generated by the multi-valued driver circuit 100 to be increased.

It should be noted that the voltage resolution of the multi-valued driver circuit 100 can be designed by determining the number of bits of each of the lower bit data and the upper bit data, i.e., Nu and Nl. In other words, the bit numbers Nu and Nl should be determined according to the resolution required for the multi-valued driver circuit 100 and the circuit area thereof.

Furthermore, by determining the resistance R and the constant value Nu such that the output impedance Zout represented by Expression (10) matches the characteristic impedance Z0 of the transmission line 102, such an arrangement provides impedance matching for the transmission/reception system.

[Second Embodiment]

Description has been made in the first embodiment regarding an arrangement in which the Thevenin termination circuit 10 has a configuration weighted in a binary manner. In contrast, a Thevenin termination circuit 10 according to a second embodiment has a configuration that does not involve weighting in a binary manner, which is a point of difference from the first embodiment. Description will be made below regarding a configuration of a multi-valued driver circuit 100a according to the second embodiment, focusing on the aforementioned point of difference.

Figure 4:
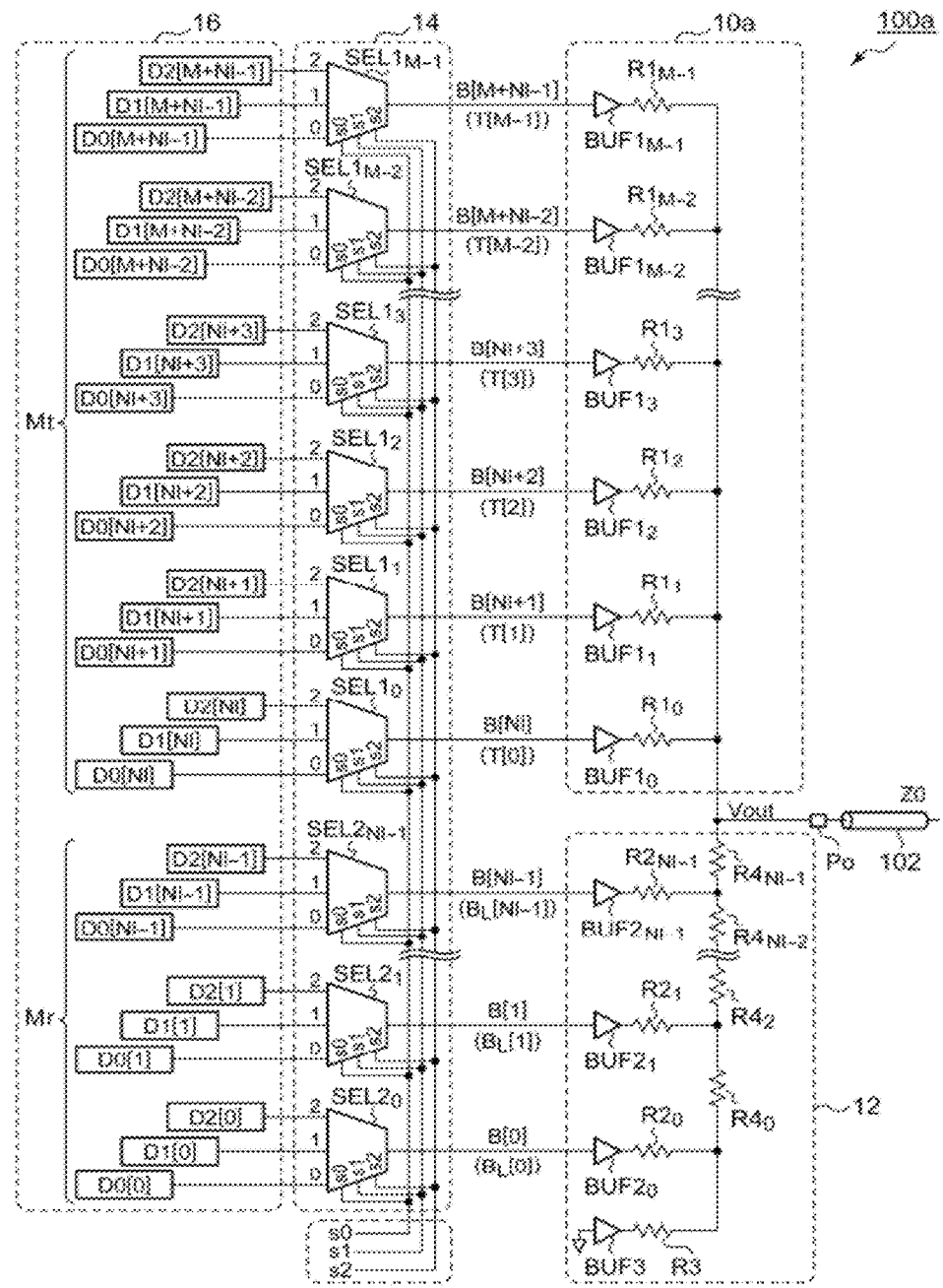
FIG. 4 is a circuit diagram which shows a configuration of a multi-valued driver circuit according to a second embodiment.

FIG. 4 is a circuit diagram which shows a configuration of a multi-valued driver circuit 100a according to a second embodiment. A Thevenin termination circuit 10a includes M first buffer units $BUF1_0$ through $BUF1_{M-1}$, and M first resistors $R1_0$ through The M first buffer units $BUF1_0$ through $BUF1_{M-1}$ are respectively associated with M first selectors $SEL1_0$ through $SEL1_{M-1}$. The M first resistors $R1_0$ through are respectively associated with the M first buffer units $BUF1_0$ through $BUF1_{M-1}$.

With the first embodiment, the number of first buffer units BUF1 and the number of first resistors R1 are each represented by $L=\Sigma_{j=0:Nu-1} 2^j = 2^{Nu}-1$. In contrast, with the second embodiment, the number of first buffer units BUF1 and the number of first resistors R1 each matches the number of first selectors SEL1, i.e., M.

The i-th ($0 \leq i \leq M-1$) first buffer unit $BUF1_i$ is configured to receive the output data B[Nl+i] of the corresponding first selector $SEL1_i$, and to output the voltage that corresponds to the value of the output data thus received (e.g., either one of Vdd or Vss).

The first resistors $R1_0$ through $R1_{M-1}$ are each arranged such that the output voltage of the corresponding first buffer BUF1 is applied to one terminal thereof, and the other terminal thereof is connected to the output port Po.

The other configuration of the multi-valued driver circuit 100a is the same as that of the multi-valued driver circuit 100 shown in FIG. 2. Next, description will be made regarding the operation of the multi-valued driver circuit 100a.

According to the selection signal s0 through s2, the selector circuit 14 outputs one data B[M+Nl-1:0] from among the setting data D0[6:0], D1[6:0], and D2[6:0] stored in the memory circuit 16.

The upper M bits B[M+Nl-1:Nl] of the data B[M+Nl-1:0], which are assigned to the Thevenin termination circuit 10a, will be represented by T[M-1:0]. With the number of bits of the M bit code T[M-1:0] having a value of 1 as $B_U$, $B_N$ is represented by the following Expression (12).

$$B_U = \Sigma_{j=0:M-1}(T[i])  \quad (12)$$

It should be noted that the order of bits according to which the bits of the code T[M-1:0] are set to 1 may be determined arbitrarily. For example, the bits of the code T[M-1:0] may be sequentially set to 1 in descending order from the upper bit, or otherwise may be sequentially set to 1 in ascending order from the lower bit. Such arrangements each provide a so-called thermometer code.

In a case in which the value of M is determined so as to satisfy the following Expression (13) using the integer Nu employed in the first embodiment, the aforementioned Expressions (5) through (10) also hold true without change in the second embodiment.

$$M = 2^{Nu} - 1 \quad (13)$$

Also, in a case in which the data which represents the value $B_U$ of the code T[M-1:0] is represented by Nu-bit binary data, by determining the integer M so as to satisfy the aforementioned Expression (13), such an arrangement allows all the bits of the binary data which represents the value $B_U$ to be effectively used, thereby providing improved code efficiency.

If the integer M is determined without involving such a constraint condition as represented by Expression (13), the following Expressions (14) through (17) hold true.

[Math. 5]

$$V_U = (Vdd - Vss)\frac{B_U}{M} + Vss \quad (14)$$

$$Z_U = \frac{R}{M} \quad (15)$$

$$Z_{out} = Z_L // Z_U = \frac{R}{M+1} \quad (16)$$

$$V_{out} = \frac{Z_U \cdot V_L + Z_L \cdot V_U}{Z_U + Z_L} = \frac{Vdd - Vss}{M+1} \cdot \left(\frac{B_L}{2^{Nl}} + B_U\right) + Vss \quad (17)$$

The multi-valued driver circuit 100a shown in FIG. 4 is also capable of generating the voltage $V_{OUT}$ that is proportional to $(B_L/2^N+B_U)/(M+1)$ that corresponds to the data B[M+Nl-1:0] output from the selector circuit 14, in the same way as with the multi-valued driver circuit 100 shown in FIG. 2.

The circuit shown in FIG. 2 has a problem in that the respective values of many bits each transit when a carry or borrow occurs in the upper data $B_U$[M-1:0]. That is to say, such a circuit shown in FIG. 2 has a problem of a long Hamming distance. In some cases, this leads to the occurrence of a relatively large glitch in the output voltage of the Thevenin termination circuit 10 when a carry or borrow occurs. In contrast, the multi-valued driver circuit 100a shown in FIG. 4 provides a reduced Hamming distance in the code T[M-1:0] that corresponds to the upper M bits of the setting data B[M+Nl-1:0], as compared with an arrangement shown in FIG. 2 in which the setting data is configured as binary data. Thus, such an arrangement is capable of suppressing the occurrence of such a glitch in the output voltage of the Thevenin termination circuit 10a.

Description has been made regarding the present invention with reference to the embodiments. The above-described embodiment has been described for exemplary purposes only, and is by no means intended to be interpreted restrictively. Rather, various modifications may be made by making various combinations of the aforementioned components or processes. Description will be made below regarding such modifications.

With the aforementioned first embodiment or second embodiment, the first buffer units and the second buffer units may be each configured to be switchable to the high-impedance state (disable state) independently. In this case, by setting all the first buffer units and all the second buffer units to the high-impedance state (disable state), such an arrangement allows the multi-valued driver circuit 100 to be completely disconnected from the transmission line 102. Also, by enabling a given buffer unit, and by disabling the other buffer units, such an arrangement allows the user to independently measure and evaluate the resistance value of the resistor connected to the particular buffer thus enabled. This is a very important advantage in designing and manufacturing such a multi-valued driver circuit 100.

Figure 5:
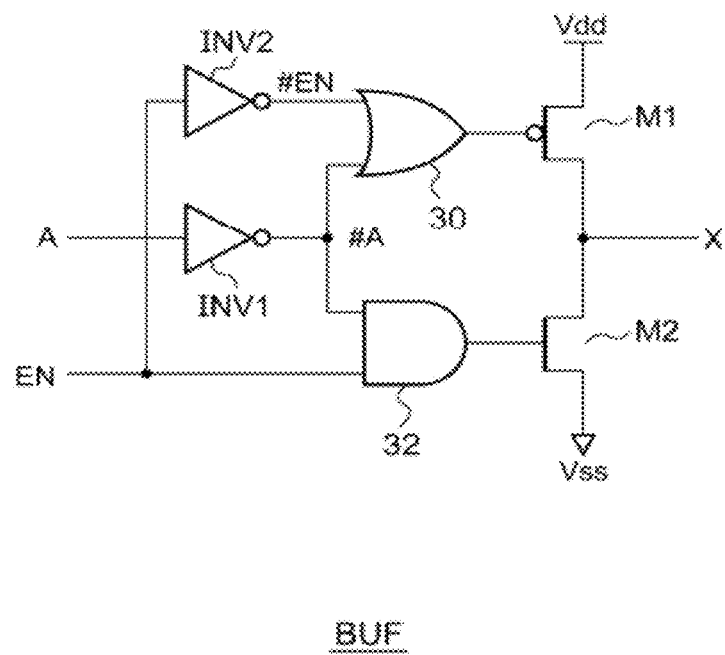
FIG. 5 is a circuit diagram which shows an example configuration of a buffer unit configured to output an output signal that is switchable to the high-impedance state.

FIG. 5 is a circuit diagram which shows an example configuration of a buffer unit having an output terminal that is switchable to the high-impedance state. A buffer unit BUF includes an enable terminal EN, a first inverter INV1, a second inverter INV2, a first transistor M1 configured as a P-channel MOSFET, a second transistor M2 configured as an N-channel MOSFET, an OR gate 30, and an AND gate 32.

The enable terminal EN receives, as an input signal, an enable signal EN which is negated (set to low level) when the state is set to the high-impedance state. The first inverter INV1 is configured to invert the data A received from the corresponding selector. The second inverter INV2 is configured to invert the enable signal EN. The first transistor M1 and the second transistor M2 are connected in series between the first power supply terminal Vdd and the second power supply terminal Vss in a push-pull manner. The OR gate 30 is configured to generate the logical OR of the output signal #A ("#" represents logical inversion) of the first inverter INV1 and the output signal #EN of the second inverter INV2, and to apply the logical OR thus generated to the gate of the first transistor M1. The AND gate 32 is configured to generate the logical AND of the output signal #A of the first inverter INV1 and the enable signal EN, and to apply the logical AND thus generated to the gate of the second transistor M2.

With such a configuration, when the enable signal EN is negated (set to low level), the first transistor M1 and the second transistor M2 are each turned off, thereby providing the high-impedance state. When the enable signal EN is asserted (set to high level), the buffer unit BUF is set to the enable state. In the enable state, when the signal A is high level, the signal X is set to the voltage Vdd, and when the signal A is low level, the signal X is set to the voltage Vss.

Also, the multi-valued driver circuit 100 according to the first embodiment or the multi-valued driver circuit 100a according to the second embodiment may be employed in a CML (Current Mode Logic) transmission circuit.

Figure 6:
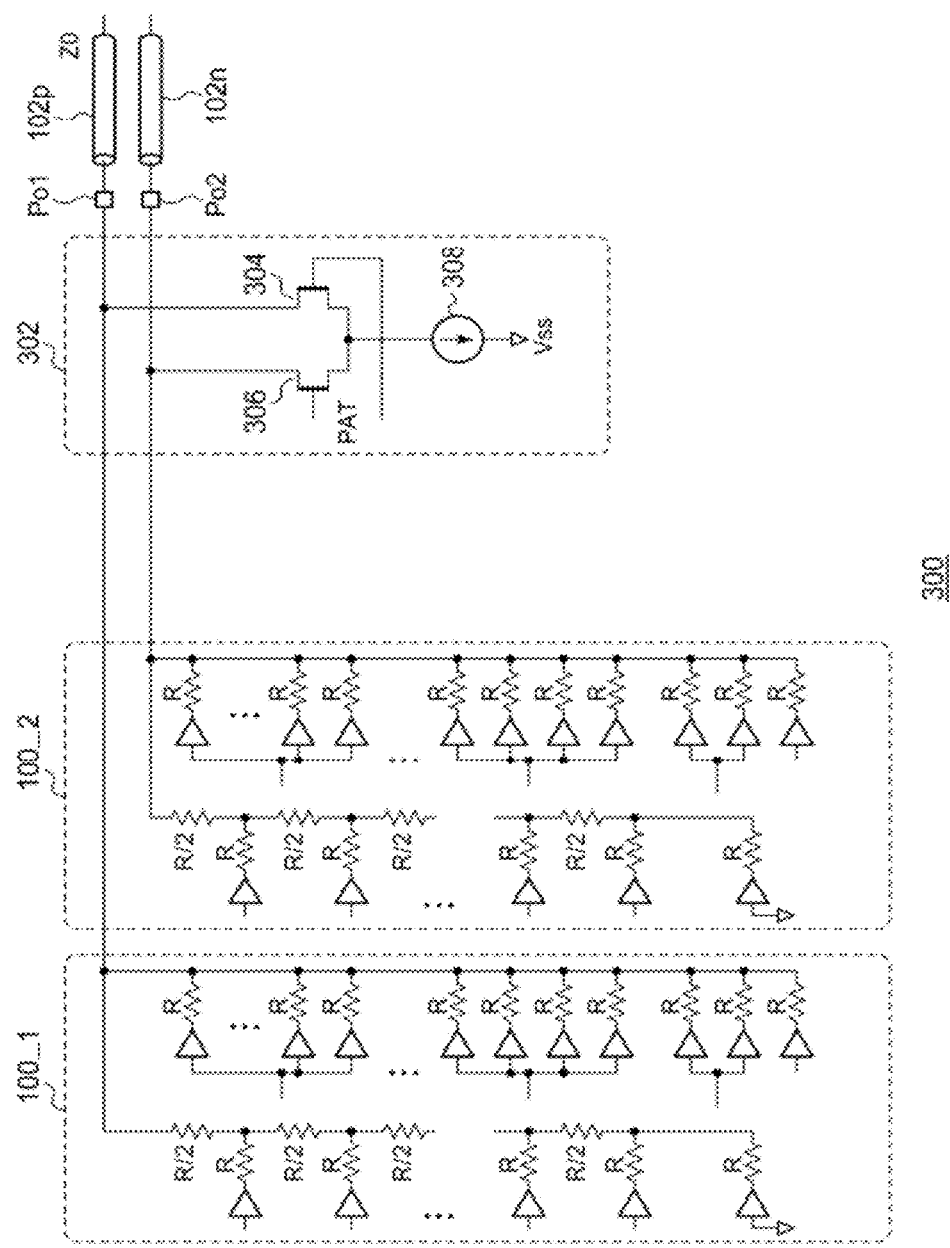
FIG. 6 is a circuit diagram which shows a differential output driver circuit including a multi-valued driver circuit according to an embodiment.

FIG. 6 is a circuit diagram which shows a differential output driver circuit 300 including a multi-valued driver circuit according to an embodiment.

The differential output driver circuit 300 includes a first output terminal Po1, a second output terminal Po2, a differential driver 302, and multi-valued driver circuits 100_1 and 100_2.

The first output terminal Po1 and the second output terminal Po2 are connected to differential transmission lines 102p and 102n, respectively.

The differential driver 302 includes a first transistor 304, a second transistor 306, and a constant current source 308. The first transistor 304 and the second transistor 306 are each configured as an N-channel MOSFET, and are arranged such that their drains are respectively connected to the first output terminal Po1 and the second output terminal Po2. The source of the first transistor 304 and the source of the second transistor 306 are each connected to the constant current source 308. One component of the differential signal PAT to be transmitted is input to the gate of the first transistor 304. The other component of the differential signal PAT to be transmitted is input to the gate of the second transistor 306.

The first multi-valued driver circuit 100_1 is configured to supply a voltage that corresponds to a selection signal to the drain of the first transistor 304, i.e., the first output terminal Po1. Similarly, the second multi-valued driver circuit 100_2 is configured to supply a voltage that corresponds to a selection signal to the drain of the second transistor 306, i.e., the second output terminal Po2. The multi-valued driver circuits 100_1 and 100_2 are configured as the multi-valued driver circuit 100 shown in FIG. 2 or otherwise the multi-valued driver circuit 100a shown in FIG. 4, and are shown in a simplified manner in FIG. 6.

The above is the configuration of the differential output driver circuit 300. Next, description will be made regarding the operation thereof. The differential output driver circuit 300 can be operated in the following three modes.

[First Mode]

The differential output driver circuit 300 outputs a signal obtained by superimposing a small-amplitude signal generated by a differential driver 302 on a voltage generated by the multi-valued driver circuits 100_1 and 100_2. Thus, by supplying a data signal as a selection signal to the multi-valued driver circuits 100_1 and 100_2, such an arrangement is capable of transmitting a multi-valued signal at a low rate. In addition, by operating the differential driver 302, such an arrangement is capable of transmitting high-rate data.

[Second Mode]

The output voltages of the multi-valued driver circuits 100_1 and 100_2 may each be fixed to a constant voltage. In this mode, the multi-valued driver circuits 100_1 and 100_2 each function as simply a 50-Ω terminator, thereby providing high-rate data transmission by means of the differential driver 302.

[Third Mode]

In the third mode, a data signal is supplied as a selection signal to each of the multi-valued driver circuits 100_1 and 100_2, and the operation of the constant current source 308 of the differential driver 302 is stopped. In this mode, the differential output driver circuit 300 functions as two separate single-ended multi-valued drivers configured to operate independently.

Figure 7:
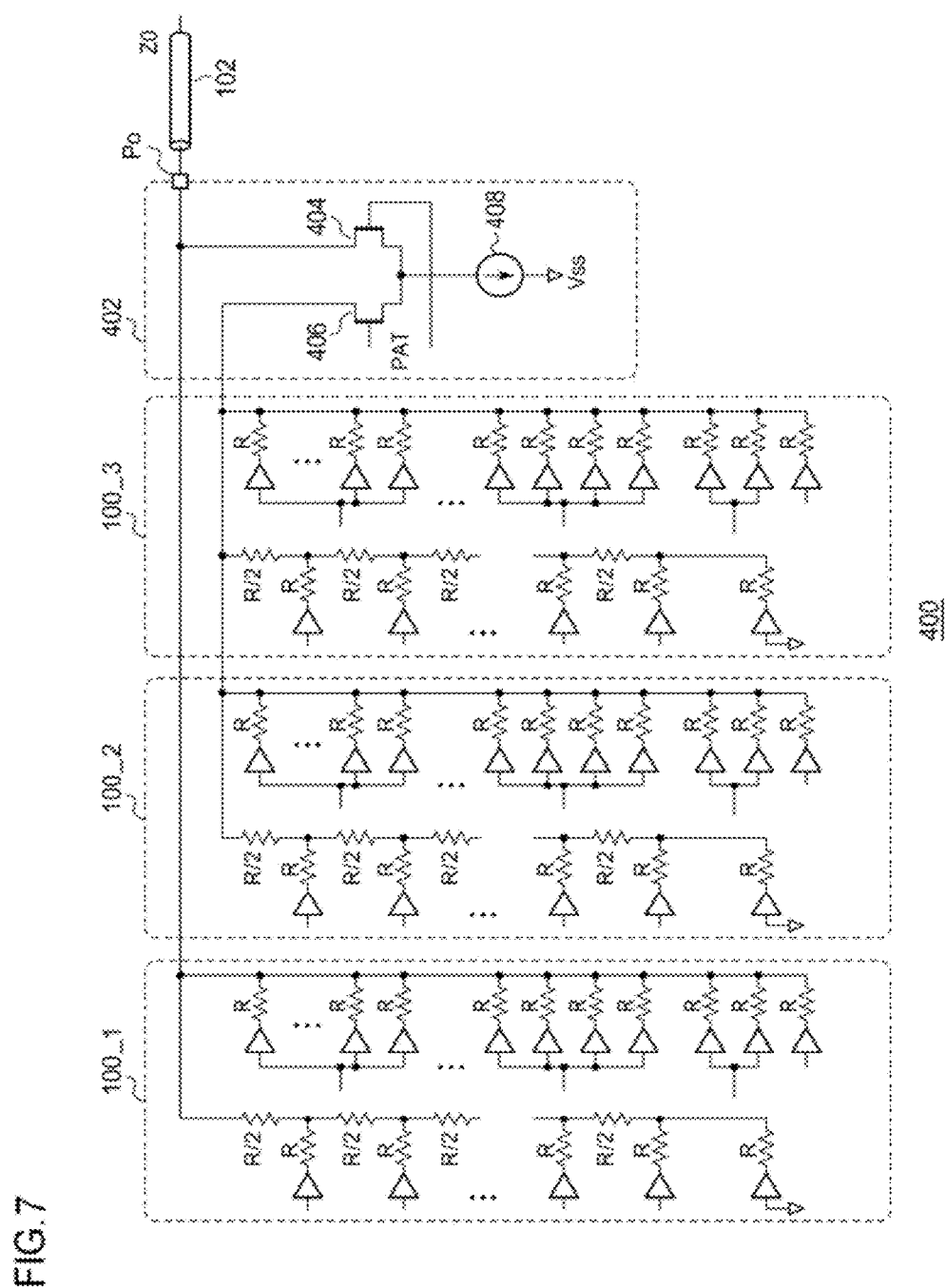
FIG. 7 is a circuit diagram which shows a single-ended output driver circuit including a multi-valued driver circuit according to an embodiment.

FIG. 7 is a circuit diagram of a single-ended output driver circuit 400 including a multi-valued driver circuit according to an embodiment.

The single-ended output driver circuit 400 includes an output terminal Po, a differential driver 402, and multi-valued driver circuits 100_1, 100_2, and 100_3. The differential driver 402 has the same configuration as that of the differential driver 302 shown in FIG. 6.

The first multi-valued driver circuit 100_1 is configured to apply a voltage that corresponds to a selection signal to the drain of the first transistor 404, i.e., the output terminal Po. The second multi-valued driver circuit 100_2 is configured to apply a voltage that corresponds to a selection signal to the drain of the second transistor 406. The third multi-valued driver circuit 100_3 is provided as a load balance circuit for the differential driver 402, and is configured to apply a voltage that corresponds to the selection signal to the drain of the second transistor 406. The third multi-valued driver circuit 100_3 is configured to fixedly output a voltage that is on the order of the voltage at the reception terminal of a device to be connected to the terminal of the transmission line 102.

Also, the single-ended output driver circuit 400 shown in FIG. 7 can be operated in the following three modes.

[First Mode]

The single-ended output driver circuit 400 outputs a signal obtained by superimposing a small-amplitude signal generated by the differential driver 402 on a voltage generated by the multi-valued driver circuit 100_1. Thus, by supplying a data signal as a selection signal to each of the multi-valued driver circuits 100_1 and 100_2, such an arrangement is capable of transmitting a multi-valued signal at a low rate. In addition, by operating the differential driver 302, such an arrangement is capable of transmitting high-rate data.

[Second Mode]

The multi-valued driver circuits 100_1 and 100_2 may be operated such that the output voltages thereof are each fixed to a constant voltage. In this mode, the multi-valued driver circuits 100_1 and 100_2 each function as simply a 50-Ω terminator, thereby providing high-rate data transmission by means of the differential driver 402.

[Third Mode]

In the third mode, a data signal is supplied as a selection signal to the multi-valued driver circuit 100_1, and the operation of the constant current source 408 of the differential driver 402 is stopped. In this mode, the single-ended output driver circuit 400 functions as a multi-valued driver circuit.

Figure 8:
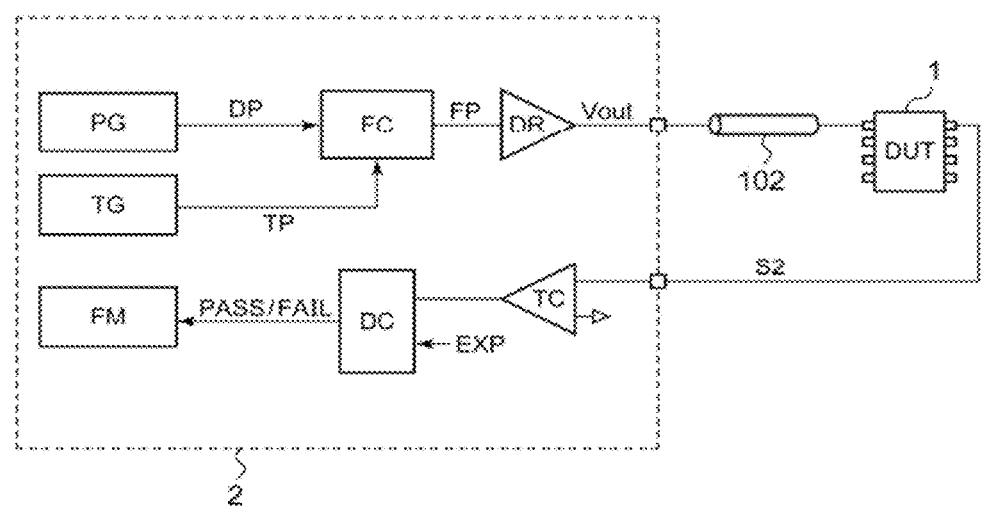
FIG. 8 is a block diagram which shows a configuration of a test apparatus including a driver circuit according to an embodiment.

Lastly, description will be made regarding an application of the multi-valued driver circuit shown in FIG. 2 or 4, or otherwise an application of the driver circuit shown in FIG. 6 or 7. FIG. 8 is a block diagram which shows a configuration of a test apparatus 2 including a driver circuit according to an embodiment.

The test apparatus 2 mainly includes a pattern generator PG, a timing generator TG, a waveform shaper FC, a driver DR, a timing comparator TC, and a logical comparator DC.

The pattern generator PG is configured to generate pattern data DP which defines a test pattern to be supplied to a DUT 1. Based upon the pattern data DP, the timing generator TG is configured to generate, for each predetermined period (which will be referred to as the "rate period $T_{RATE}$" hereafter), timing setting data TP which is configured to set each positive edge timing and each negative edge timing of a signal $V_{OUT}$ to be supplied to the DUT 1.

The waveform shaper FC is configured to receive the pattern data DP and the timing setting data TP, and to generate an output signal FP having a value that changes at a timing that corresponds to the data thus received. The driver DR is configured as any one from among the driver circuits 100, 100a, 300, and 400 according to the aforementioned embodiments. The driver DR is configured to output, to the DUT 1, the voltage $V_{OUT}$ having a level that corresponds to the signal FP received from the waveform shaper FC.

The timing comparator TC is configured to receive a signal S2 output from the DUT 1, and to latch the value of the signal S2 thus received at a predetermined timing. The logical comparator DC is configured to compare, for every test cycle, the output signal of the timing comparator TC with a corresponding expected value EXP, and to generate a pass/fail signal PASS/FAIL which indicates whether or not the output signal of the timing comparator TC matches the corresponding expected value EXP. The pass/fail signal is stored in the fail memory FM.

The above is an example configuration of the test apparatus 2. By applying any one from among the driver circuits 100, 100a, 300, and 400 according to the embodiments to the driver DR of such a test apparatus 2, such an arrangement allows the signal level to be supplied to the DUT 1 to be adjusted as desired according to the kind of DUT 1 and the test item.

While the preferred embodiments of the present invention have been described using specific terms, such description is for illustrative purposes only, and it is to be understood that changes and variations may be made without departing from the spirit or scope of the appended claims.

The invention claimed is:

1. A multi-valued driver circuit configured to selectively output, to a transmission line, one from among K voltages according to a selection signal, K representing an integer of 2 or more, and to be capable of independently adjusting the K voltages according to (M+Nl)-bit setting data, M and Nl each representing an integer, the multi-valued driver circuit comprising:
an output port connected to the transmission line;
first memory configured to store the upper M bits of the setting data for each of the K voltages;
second memory configured to store the lower Nl bits of the setting data for each of the K voltages;
M first selectors respectively provided for the upper M bits of the setting data, each configured to receive the corresponding bits of the K setting data, and to select one from among the corresponding bits of the K setting data according to the selection signal;
Nl second selectors respectively provided for the lower Nl bits of the setting data, each configured to receive the corresponding bits of the K setting data, and to select one from among the corresponding bits of the K setting data according to the selection signal;
M first buffer units respectively provided for the M first selectors, and each configured to output a voltage that corresponds to the output value of the corresponding first selector;
M first resistors respectively provided for the M first buffer units, each configured to have a resistance value R, and each arranged such that the output voltage of the corresponding first buffer unit is applied to one terminal thereof, and the other terminal thereof is connected to the output port;
Nl second buffer units respectively provided for the Nl second selectors, and each configured to output a voltage that corresponds to the output value of the corresponding second selector;
a third buffer unit configured to generate a fixed voltage;
Nl second resistors respectively provided for the Nl second buffer units, each configured to have a resistance value R, and each arranged such that the output voltage of the corresponding second buffer unit is applied to one terminal thereof;
a third resistor configured to have a resistance value R, and arranged such that the output voltage of the third buffer unit is applied to one terminal thereof; and
Nl fourth resistors connected so as to form a R-2R ladder network together with the Nl second resistors and the third resistor, with the aforementioned output port as an output terminal of the R-2R ladder network.

2. A multi-valued driver circuit according to claim 1, wherein each of the first buffer units and the second buffer units is configured such that its output is switchable independently to a high-impedance state.

3. A multi-valued driver circuit according to claim 2, wherein the first buffer units and the second buffer units each comprise:
an enable terminal configured to receive an enable signal which is negated when the state is set to the high-impedance state;
a first inverter configured to invert data received from the corresponding selector;
a second inverter configured to invert the enable signal;
a P-channel MOSFET and an N-channel MOSFET connected in series in a push-pull manner between a first voltage terminal and a second voltage terminal;
an OR gate configured to generate the logical OR of the output signal of the first inverter and the output signal of the second inverter, and to apply the logical OR thus generated to the gate of the P-channel MOSFET; and
an AND gate configured to generate the logical AND of the output signal of the first inverter and the enable signal, and to apply the logical AND thus generated to the gate of the N-channel MOSFET.

4. A differential output driver circuit comprising:
a first output terminal and a second output terminal;
a constant current source;
a first MOSFET arranged such that its source is connected to the constant current source, its drain is connected to the first output terminal, and one component of a differential signal is input to its gate;
a second MOSFET arranged such that its source is connected to the constant current source, its drain is connected to the second output terminal, and the other component of the differential signal is input to its gate;

a first multi-valued driver circuit according to claim 1, configured to supply a voltage to the drain of the first MOSFET; and a second multi-valued driver circuit according to claim 1, configured to supply a voltage to the drain of the second MOSFET.

5. A single-ended output driver circuit comprising:

an output terminal;

a constant current source;

a first MOSFET arranged such that its source is connected to the constant current source, its drain is connected to the output terminal, and one component of a differential signal is input to its gate;

a second MOSFET arranged such that its source is connected to the constant current source, and the other component of the differential signal is input to its gate;

a first multi-valued driver circuit according to claim 1, configured to supply a voltage to the drain of the first MOSFET;

a second multi-valued driver circuit according to claim 1, configured to supply a voltage to the drain of the second MOSFET; and a third multi-valued driver circuit according to claim 1, configured to supply a voltage to the drain of the second MOSFET.

6. A test apparatus configured to test a device under test, the test apparatus comprising a driver circuit according to claim 1, configured to output, to the device under test, a voltage that corresponds to a test pattern.

7. A multi-valued driver circuit configured to selectively output, to a transmission line, one from among K voltages according to a selection signal, where K represents an integer of 2 or more, and to be capable of independently adjusting the K voltages according to (Nu+Nl)-bit setting data, where Nu and Nl each represent an integer, the multi-valued driver circuit comprising:

an output port connected to the transmission line;

first memory configured to store the upper Nu bits of the setting data for each of the K voltages;

second memory configured to store the lower Nl bits of the setting data for each of the K voltages;

Nu first selectors respectively provided for the upper Nu bits of the setting data, and each configured to receive the corresponding bits of the K setting data, and to select one from among the corresponding bits of the K setting data according to the selection signal;

Nl second selectors respectively provided for the lower Nl bits of the setting data, and each configured to receive the corresponding bits of the K setting data, and to select one from among the corresponding bits of the K setting data according to the selection signal;

L ($L=2^{Nu}-1$) first buffer units grouped into a plurality of groups, the j-th (j=0, 1, . . . , Nu−1) group including $2_j$ first buffer units, and arranged such that the input terminals of the first buffer units that belong to the same group are connected together for each group, and such that the $2_j$ first buffer units that belong to the j-th group each output a voltage that corresponds to the output value of the first selector that corresponds to the lower (j+Nl)-th bit of the setting data;

L first resistors respectively provided for the L first buffer units, each configured to have a resistance value R, and each arranged such that the output voltage of the corresponding first buffer unit is applied to one terminal thereof and the other terminal thereof is connected to the output port;

Nl second buffer units respectively provided for the Nl second selectors, and each configured to output a voltage that corresponds to the output value of the corresponding second selector;

Nl second resistors respectively provided for the Nl second buffer units, each configured to have a resistance value R, and each arranged such that the output voltage of the corresponding second buffer unit is applied to one terminal thereof;

a third buffer unit configured to generate a fixed voltage; and

Nl fourth resistors each configured to have a resistance value of R/2, and connected so as to form a R-2R ladder network together with the Nl second resistors and the third resistor, with the aforementioned output port as an output terminal of the R-2R ladder network.

8. A multi-valued driver circuit according to claim 7, wherein each of the first buffer units and the second buffer units is configured such that its output is switchable independently to a high-impedance state.

9. A multi-valued driver circuit according to claim 8, wherein the first buffer units and the second buffer units each comprise:

an enable terminal configured to receive an enable signal which is negated when the state is set to the high-impedance state;

a first inverter configured to invert data received from the corresponding selector;

a second inverter configured to invert the enable signal;

a P-channel MOSFET and an N-channel MOSFET connected in series in a push-pull manner between a first voltage terminal and a second voltage terminal;

an OR gate configured to generate the logical OR of the output signal of the first inverter and the output signal of the second inverter, and to apply the logical OR thus generated to the gate of the P-channel MOSFET; and an AND gate configured to generate the logical AND of the output signal of the first inverter and the enable signal, and to apply the logical AND thus generated to the gate of the N-channel MOSFET.

10. A differential output driver circuit comprising:

a first output terminal and a second output terminal;

a constant current source;

a first MOSFET arranged such that its source is connected to the constant current source, its drain is connected to the first output terminal, and one component of a differential signal is input to its gate;

a second MOSFET arranged such that its source is connected to the constant current source, its drain is connected to the second output terminal, and the other component of the differential signal is input to its gate;

a first multi-valued driver circuit according to claim 7, configured to supply a voltage to the drain of the first MOSFET; and a second multi-valued driver circuit according to claim 7, configured to supply a voltage to the drain of the second MOSFET.

11. A single-ended output driver circuit comprising:

an output terminal;

a constant current source;

a first MOSFET arranged such that its source is connected to the constant current source, its drain is connected to the output terminal, and one component of a differential signal is input to its gate;

a second MOSFET arranged such that its source is connected to the constant current source, and the other component of the differential signal is input to its gate;

a first multi-valued driver circuit according to claim 7, configured to supply a voltage to the drain of the first MOSFET;

a second multi-valued driver circuit according to claim 7, configured to supply a voltage to the drain of the second MOSFET; and a third multi-valued driver circuit according to claim 7, configured to supply a voltage to the drain of the second MOSFET.

12. A test apparatus configured to test a device under test, the test apparatus comprising a driver circuit according to claim 7, configured to output, to the device under test, a voltage that corresponds to a test pattern.

* * * * *